March 9, 1954     C. W. WOODCOCK     2,671,477
SAW GUIDE FOR CIRCULAR SAWS
Filed May 12, 1952
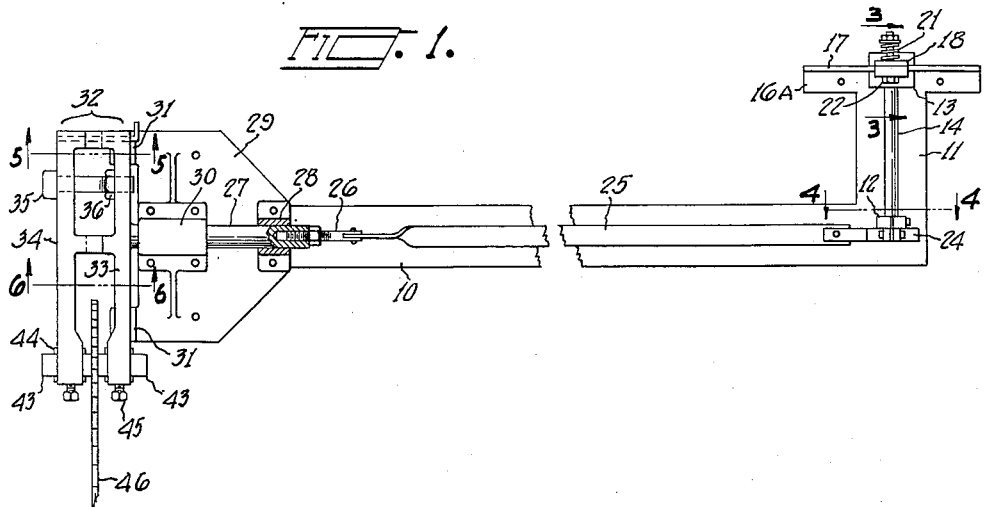
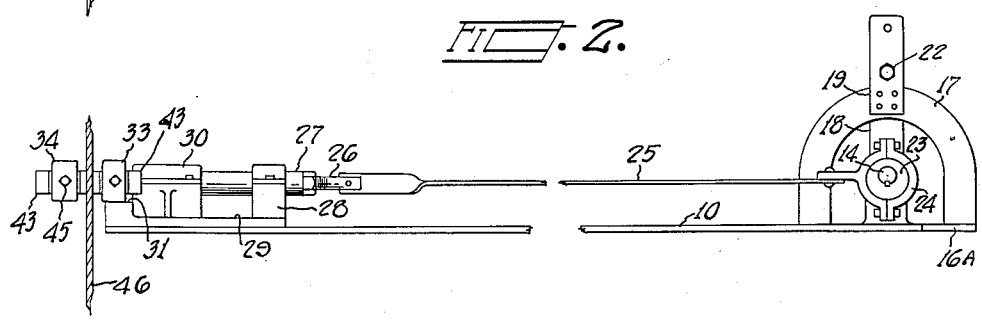
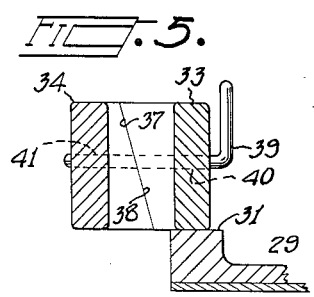
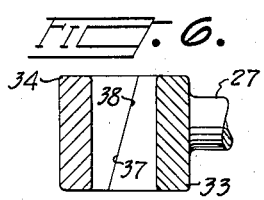
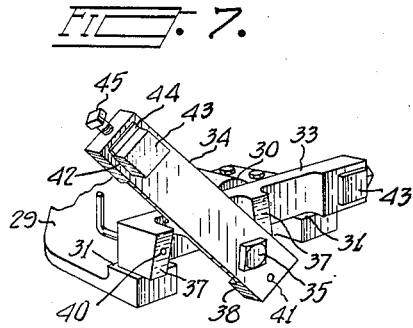
INVENTOR
CAROL W. WOODCOCK
ATTORNEY Patented Mar. 9, 1954

2,671,477

UNITED STATES PATENT OFFICE 2,671,477

SAW GUIDE FOR CIRCULAR SAWS

Carol W. Woodcock, Ashland, Oreg.

Application May 12, 1952, Serial No. 287,364

4 Claims. (Cl. 143—165)

This invention relates generally to circular saws such as are used in sawmills and particularly to a saw guide for circular saws.

The main object of this invention is to produce a guide which opens instantly without the use of tools and without moving the saw or changing the adjustments.

A further object is to enable the operator to restore a given setting for the guide with the utmost accuracy.

I accomplish these and other objects in the manner set forth in the following specifications as illustrated in the accompanying drawing, in which:

Fig. 1 is a plan of the entire guide.

Fig. 2 is a side elevation of Fig. 1 showing a fragment of the saw in cross section.

Fig. 3 is a section taken along the line 3—3 in Fig. 1.

Fig. 4 is a section taken along the line 4—4 in Fig. 1.

Fig. 5 is a fragmentary section taken along the line 5—5 in Fig. 1.

Fig. 6 is a fragmentary section taken along the line 6—6 in Fig. 1.

Fig. 7 is a perspective view of the slidable head for holding the wearing blocks.

Like numbers of reference refer to the similar parts throughout the several views.

Referring in detail to the drawing there is shown an elongated base 10 having a laterally turned portion 11 on which are mounted the standards 12 and 13 in which is journaled a shaft 14. The standards 12 and 13 are provided with slots 15 (Fig. 4) across each of which is placed an adjusting screw 16. One end 16-A of the portion 11 has an upturned quadrant 17.

On the end of the shaft 14 under the quadrant 17 is pinned a lever 18 on which is loosely mounted an arm 19. Friction elements 20 are attached to the adjacent sides of the members 18 and 19. A spring 21 on a bolt 22 urges the friction elements 20 against opposite sides of the quadrant 17. On the opposite end of the shaft 14 is secured an eccentric 23 whose strap 24 is attached by a link 25 to a screw 26 which is threaded into a spindle 27 which forms a slide within the guide 28 formed on the sub base 29 on which is also formed the main guide 30 beyond which the spindle 27 extends.

Below the spindle 27 and spaced on opposite sides of the sub base 29 are the pads 31. Mounted securely on the end of the spindle 27 is an A-shaped head 32 composed of the parts 33 and 34. The part 33 rides on the pads 31 and is pivotally connected to the part 34 by a bolt 35 which is threaded into the part 33 and locked thereto by the nut 36. The part 33 has formed thereon the oppositely turned cam faces 37 and the part 34 has formed thereon the oppositely turned cam faces 38 which register with the faces 37 when the parts 33 and 34 are turned to the same horizontal plane as shown in Fig. 5, then the cam surfaces 37 and 38 are held in close contact by the bolt 35 and they are held securely in this position by the pin 39 which occupies the holes 40 and 41 in the parts 33 and 34.

In the end of the head 32, remote from the pin 39, are the transverse openings 42 in which are placed the wooden blocks 43. Bearing plates 44 are placed in the openings 42 against the blocks 43 and clamped against the blocks 43 by means of the screws 45.

In setting up the guide, the lever 18 is moved manually until the saw blade 46 is midway between the members 33 and 34 and the blocks 43 are moved into contact with the blade 46 while the pin 39 is in place, thereby guiding the saw blade 46 in the desired cutting line.

I claim:

1. A saw guide for circular saws comprising a two-part head composed of elongated members substantially parallel to the plane of the saw and having a pair of adjustable saw engaging blocks mounted in one end thereof and having the opposite ends of said pair of members pivotally connected by means of a bolt parallel to the saw-axis and having cam faces formed between the members of said pair adapted to tighten said members against said bolt when the members of said pair are rotated with relation to each other, a pin passing through both members of said pair for holding same in a parallel relationship when said saw engaging blocks are in axial alignment, means for moving both of said members in unison parallel to the axis of said pivot bolt and means for preventing rotary movement of one of said members.

2. A saw guide for circular saws comprising an elongated base, parallel to the saw axis an A-shaped head slidably mounted on said base at a right angle thereto, said head being formed in two parts separable down the center line of the "A" and rotatable with relation to each other, means for locking said parts against said relative rotation, a bolt secured in one portion of said head forming a pivot parallel to the saw axis for the other portion of said head, a pair of cams disposed between the members of said head for urging the parts away from each other against the